June 26, 1923.  
T. SHILL  
1,460,282
OWNER'S IDENTIFICATION MEANS FOR PROTECTING AUTOMOBILES AGAINST THEFT
Filed Feb. 15, 1922
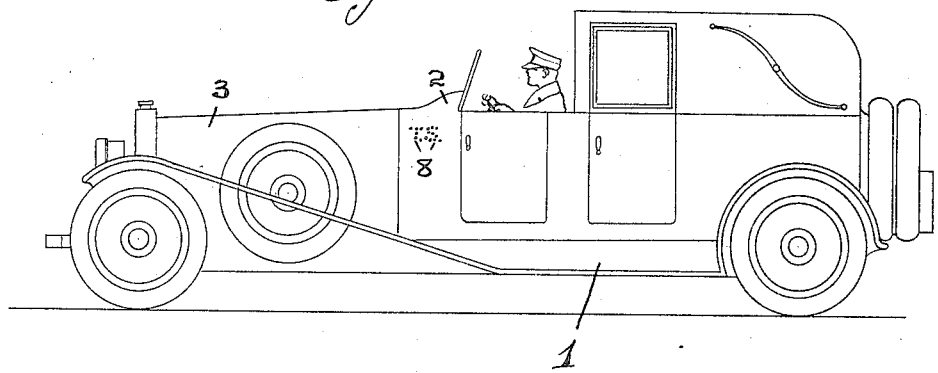
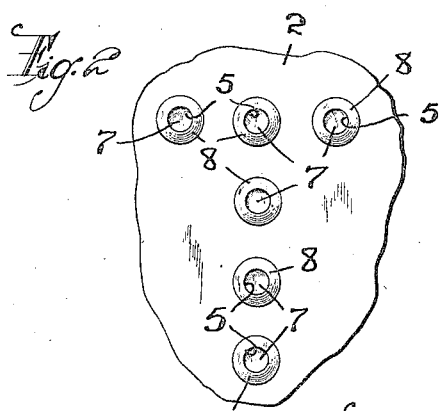
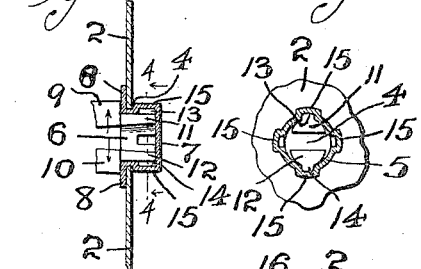
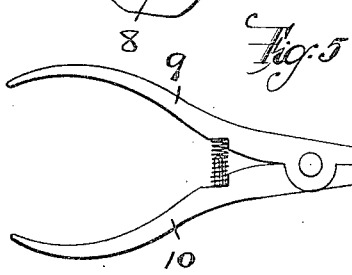
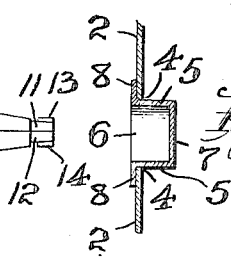
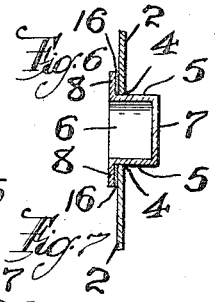
INVENTOR:  
Thomas Shill,  
BY  
Fraentzel and Richards,  
ATTORNEYS.

Patented June 26, 1923.

1,460,282

UNITED STATES PATENT OFFICE.

THOMAS SHILL, OF HIGHLAND PARK, NEW JERSEY.

OWNER'S IDENTIFICATION MEANS FOR PROTECTING AUTOMOBILES AGAINST THEFT.

Application filed February 15, 1922. Serial No. 536,700.

*To all whom it may concern:*

Be it known that I, THOMAS SHILL, a citizen of the United States, residing at Highland Park, in the county of Middlesex and State of New Jersey, have invented certain new and useful Improvements in Owner's Identification Means for Protecting Automobiles Against Theft; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in identification devices for use with automobiles and similar vehicles; and, the present invention has reference more particularly to a novel and simply constructed owner's identification means for automobiles which is readily applicable to the cowl or other part of the automobile-body, is adapted to be permanently secured thereto, and can not be easily removed without marring or damaging that portion of the body to which it is adapted to be attached.

The present invention, therefore, has for its principal objects to provide a novel, cheap and simply constructed owner's identification means for automobiles, which is easily and permanently attached to the cowl, hood, or other part of the vehicle-body, with a view of providing a device which is ornamental, and at the same time can not be removed without the exertion of labor, and if removed leaving the body of the vehicle in a marred or damaged condition.

The invention has for its further object to provide an identification means which is constructed in such a manner, that when it is applied to the cowl or hood of the vehicle, there will be no exposed perforations through which water from rain or snow, or when washing the vehicle, might percolate causing short circuits which might injure the electrical devices located beneath the cowl or hood.

Other objects of the present invention not at this time more particularly enumerated, will be clearly understood from the following detailed description of the same.

With the various objects of the present invention in view, the invention consists in the novel owner's identification means for automobiles, and the like, as hereinafter more fully set forth.

The invention is clearly set forth in the accompanying drawings, in which:—

Figure 1 is a side view of a vehicle, as an automobile, provided in the cowl thereof with an identification means made according to and embodying the principles of the present invention.

Figure 2 is a face view of a fragmentary portion of the cowl or hood of the vehicle, provided with the owner's identification means, the same being arranged in the form of a letter T, and the said view being made on an enlarged scale.

Figure 3 is a still larger sectional representation of a portion of the cowl or hood of the vehicle and one of the identification devices secured in its position therein, said view showing in connection therewith the ends of a tool for permanently attaching the device in place; and Figure 4 is a transverse vertical section, taken on line 4—4 in said Figure 3.

Figure 5 is a side view of a tool adapted for use with the identification devices for permanently securing the same in place; and Figures 6 and 7 are sectional representations of portions of the cowl, or hood, and the identification devices, showing the latter in position, but not permanently attached, Figure 6 also showing in connection with the parts, a water-tight gasket or washer, disposed between the outer face of the cowl, or hood, and a flanged portion of the identification device.

Similar characters of reference are employed in the hereinabove described figures of the drawings, to indicate corresponding parts.

Referring now to the several figures of the drawings, the reference-character 1 indicates a vehicle, as an automobile, the character 2 indicating the cowl, and 3 the hood thereof.

The identification means which may be arranged upon the cowl, hood, or other metal part of the vehicle consists in the arrangement of a multiplicity of cup-shaped devices, disposed in perforations 4 with which the cowl, hood or other metal part is provided, in the form of a letter or letters, indicating the initials or the name of the owner of the vehicle, or these devices may be arranged in the form of a monogram, or any desired insignia.

Each device consists, essentially, of a cylindrically or other suitably formed body 5, according to the shape or hole 4 in which it is to be fitted, said body 5 being open at one end, as at 6, and having a closing wall 7 at its other end. The open-end portion of the said body 5 is made with an annular flange, as 8.

When these devices are inserted in the holes or perforations 4 in the cowl, hood, or other metal part of the vehicle-body, with the annular flange 8 placed upon or against the surrounding metal portions, bounding the said holes or perforations 4, the ends 11 and 12 of a tool comprising a pair of handle-members 9 and 10, see Figure 5, are inserted through the open end 6 into the interior of the body 5. Each end 11 and 12 of the tool being formed with projections, as 13 and 14, when the handle-members of the tool are pressed together, will provide the wall-portions of the said body 5 with outwardly extending retaining projections, as 15, between which and the said flange 8, the surrounding portions of the cowl, hood, or the like, will thus become firmly gripped, so that the identification device will be permanently affixed in its operative position, as will be clearly evident.

That a very tight and a waterproof joint may be had directly back of the flange 8 of each device, a washer or gasket, as 16, which may be made of rubber or a soft metal, or other suitable material, may be placed directly back of the flange 8, substantially as illustrated in Figure 6 of the drawings.

As shown in said Figure 2, any number of such holes or perforations 4, and tubular devices may be used, these being arranged in the forms of letters, monograms, or other suitable insignia, and each body 5 having a closed end or wall 7, there will be no danger of water from rain, snow, or when washing the body of the vehicle, getting under to cowl, hood, or the like, to produce any objectionable short-circuiting of the electrical devices located at these points, as will be clearly evident.

The preferred locations of these devices is in the cowl of the vehicle-body, since by locating the devices at these points, any possibility of chipping away the secured ends of the several identification devices is reduced to a minimum, owing to the inaccessibility of getting at the secured portions of the devices beneath the cowl.

Of course I am aware that some changes may be made in the general arrangements and combinations of the various devices, as well as in the details of the construction of the parts thereof, without departing from the scope of the present invention as set forth in the foregoing specification. Hence, I do not limit my present invention to the exact arrangements and combinations of the several devices and parts as described in the said specification, nor do I confine myself to the exact details of the construction of the said parts, as illustrated in the accompanying drawings.

I claim:—

1. In an automobile in combination with a metal part of the body of the vehicle formed with a series of perforations, a flanged tubular body inserted in each perforation, each tubular body being formed with a closed end-wall to prevent water from entering back of said body.

2. In an automobile in combination with a metal part of the body of the vehicle formed with a series of perforations, a flanged tubular body inserted in each perforation, each tubular body being formed with a closed end-wall to prevent water from entering back of said body, and means connected with each tubular body for securing the same in place against displacement.

3. In an automobile in combination with a metal part of the body of the vehicle formed with a series of perforations, a flanged tubular body inserted in each perforation, each tubular body being formed with a closed end-wall to prevent water from entering back of said body, and a series of projections extending outwardly from said tubular body in retaining engagement with the metal part of said vehicle-body.

4. In an automobile in combination with the metal part of the body of the vehicle formed with a series of perforations, a tubular body inserted in each perforation, each tubular body being provided with an annular flange, a washer upon each tubular body between the flange thereof and the metal part of said vehicle body, and each tubular body being formed with a closed end-wall to prevent water from entering back of said body.

5. In an automobile in combination with the metal part of the body of the vehicle formed with a series of perforations, a tubular body inserted in each perforation, each tubular body being provided with an annular flange, a washer upon each tubular body between the flange thereof and the metal part of said vehicle-body, and each tubular body being formed with a closed end-wall to prevent water from entering back of said body, and means connected with each tubular body for securing the same in place against displacement.

6. In an automobile in combination with the metal part of the body of the vehicle formed with a series of perforations, a tubular body inserted in each perforation, each tubular body being provided with an annular flange, a washer upon each tubular body between the flange thereof and the metal part of said vehicle-body, and each tubular body being formed with a closed end-wall to prevent water from entering back of said body, and a series of projections extending outwardly from said tubular body in retaining engagement with the metal part of said vehicle-body.

In testimony that I claim the invention set forth above I have hereunto set my hand this 14th day of February, 1922.

THOMAS SHILL.

Witnesses:
FREDK. C. FRAENTZEL,
EVA E. DESCH.